United States Patent Office 3,812,206
Patented May 21, 1974

3,812,206
POLYFLUOROPOLYMERS
Ronald Eric Banks, Hazel Grove, and Robert Neville Haszelding, Disley, England, assignors to The Secretary of State for Defence in Her Britannic Majesty's Government of the United Kingdom of Great Britain and Northern Ireland, London, England
No Drawing. Filed Jan. 30, 1973, Ser. No. 327,840
Claims priority, application Great Britain, Jan. 31, 1972, 4,383/72
Int. Cl. C08f 29/16
U.S. Cl. 260—890          22 Claims

ABSTRACT OF THE DISCLOSURE

A process for cross-linking a polyfluoropolymer containing pendant perfluorovinyl groups including the step of treating the polyfluoropolymer with an effective amount of a cross-linking agent including the structural unit:

$$-\left[\begin{array}{c}N-R'_F-N-O-O\\ |\quad\quad\quad |\\ R_F\quad\quad R_F\end{array}\right]-$$

wherein $R'_F$ is a divalent polyfluoroalkylene group having a chain length of from 1 to 4 carbon atoms which may be substituted at one or more positions with chloro- or polyfluoroalkyl, chlorofluoroalkyl or polyfluorocycloalkyl groups containing up to six carbon atoms, and $R_F$ is a monovalent straight or branched chain, or cyclic, polyfluoroalkyl group or a chlorofluoroalkyl group containing up to ten carbon atoms and the $R_F$ groups are the same or different or is a divalent polyfluoroalkylene group having a chain length of from 1 to 4 carbon atoms which may be substituted at one or more positions with chloro- or polyfluoroalkyl, chlorofluoroalkyl or polyfluorocycloalkyl groups containing up to six carbon atoms; and the $R_F$ groups are interconnected to form a cyclic structure.

---

The present invention relates to processes for cross-linking polyfluoropolymers containing pendant perfluorovinyl groups $-(R_F)_xCF=CF_2$, where $R_F$ is a divalent polyfluoroalkylene group and $x$ is 0, 1, 2 or more. Preferred polyfluoropolymers are nitroso-rubbers.

Nitroso-rubbers are polymers formed by the reaction of a perfluoronitroso-alkane with a perfluoro-olefin, and contain the —N—O—C—C— unit in the main chain of the polymer. A typical nitroso-rubber is that formed by the reaction of trifluoronitrosomethane with tetrafluoroethylene to give the polymer $$-\left[\begin{array}{c}N-O-CF_2-CF_2\\ |\\ CF_3\end{array}\right]_n-$$

and the ratio of nitroso-compound to olefin in the polymer is always 1:1. Terpolymers containing unsaturation can be prepared, for example by the incorporation of a diene such as perfluorobutadiene; the terpolymer then contains both $$-N-O-CF_2CF_2- \text{ and } -N-O-CF_2-CF-$$
$$\quad |\quad\quad\quad\quad\quad\quad\quad\quad |\quad\quad\quad\quad |$$
$$\ CF_3\quad\quad\quad\quad\quad\quad\quad CF_3\quad\quad CF=CF_2$$

plus $$-N-O-CF_2-CF=CF-CF_2-$$
$$\quad |$$
$$\ CF_3$$

units, and the ratio of the nitroso-compound to the olefin+diene in the terpolymer is still 1:1. Preferably such polymers are perfluorinated.

No completely satisfactory method has hitherto been known for the cross-linking of such polymers or terpolymers without the loss of some of the outstanding chemical resistance and useful low-temperature properties that the nitroso-polymers possess; thermal stability is also often diminished by use of cross-linking agents such as diamines (e.g. hexamethylenediamine) or diols, or conventional free radical sources such as benzoyl peroxide. In general trifluoronitrosomethanetetrafluoroethylene elastomers have not been capable of continuous use much above 150° C.

According to the present invention a process for cross-linking a polyfluoropolymer containing pendant perfluorovinyl groups including the step of treating the polyfluoropolymer with an effective amount of a cross-linking agent including the structural unit $$-\left[\begin{array}{c}N-R'_F-N-O\\ |\quad\quad\quad |\\ R_F\quad\quad R_F\end{array}\right]-$$

wherein $R'_F$ is a divalent polyfluoroalkylene group having a chain length of from 1 to 4 carbon atoms and where the polyfluoroalkylene group may be substituted at one or more positions with chloro- or polyfluoroalkyl, chlorofluoroalkyl or polyfluorocycloalkyl groups containing up to six carbon atoms; and $R_F$ is a monovalent straight or branched chain, or cyclic, polyfluoroalkyl group containing up to ten carbon atoms or a chlorofluoroalkyl group containing up to ten carbon atoms and the $R_F$ groups are the same or different or is a divalent polyfluoroalkylene group having a chain length of from 1 to 4 carbon atoms and where the polyfluoroalkylene group may be substituted at one or more positions with chloro- or polyfluoroalkyl, chlorofluoroalkyl or polyfluorocycloalkyl groups containing up to six carbon atoms; and the $R_F$ groups are interconnected to form a cyclic structure.

The term polyfluoro as used herein includes, and is preferably perfluoro. The term chlorofluoroalkyl as used herein refers to substituted alkyl groups in which only chlorine, fluorine and carbon are present. Advantageously not more than one atom of chlorine is present in any chlorofluoroalkyl group.

In accordance with one aspect of the present invention, a process for cross-linking a polyfluoropolymer containing pendant perfluorovinyl groups comprises treating said polyfluoropolymer with an effective amount of a cross-linking agent which is a bisnitroxide having the general formula:

$$-O-N-R'_F-N-O-$$
$$\quad\quad |\quad\quad\quad\quad |$$
$$\ R_F\quad\quad R_F$$

wherein $R'_F$ and $R_F$ are as hereinbefore defined.

Preferred bisnitroxide cross-linking agents in accordance with this aspect of the invention have the general formula $$-O-N-CF_2-CF-N-O-$$
$$\quad\quad |\quad\quad\quad |\quad\quad\quad |$$
$$\ P_F\quad\quad Q_F\quad P_F$$

wherein $P_F$ is a monovalent straight or branched chain, or cyclic, polyfluoroalkyl group containing up to ten carbon atoms or a chlorofluoroalkyl group containing up to ten carbon atoms and the $P_F$ groups may be the same or different; and $Q_F$ is chlorine or fluorine or a straight or branched chain, or cyclic, polyfluoroalkyl group containing up to six carbon atoms or a chlorofluoroalkyl group containing up to six carbon atoms.

Bisnitroxide diradicals having the general formula:

$$-O-N-CF_2-CF-NO-$$
$$\quad\quad |\quad\quad\quad |\quad\quad\ |$$
$$\ P_F\quad\quad Q_F\quad P_F$$

and processes for their preparation are disclosed in our co-pending patent application 4382/72. The cross-linking reaction of the present invention may be carried out by mixing the polyfluoropolymer containing pendant perfluorovinyl groups with the bisnitroxide diradical and allowing them to react. Normally, however, better results are obtained by applying heat and/or pressure to a mixture of the said polyfluoropolymer and the bisnitroxide radical.

A preferred bisnitroxide radical for use in the present invention is perfluoro-(2,5-dioxyl-2,5-diazahexane) which has the formula:

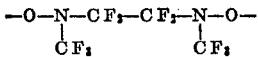

In accordance with an alternative aspect of the present invention a process for cross-linking a polyfluoropolymer containing pendant perfluorovinyl groups comprises treating said polyfluoropolymer with an effective amount of a cross-linking agent which is a compound having the formula

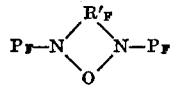

where $R'_F$ and $P_F$ are as hereinbefore defined. Preferably a compound having the formula

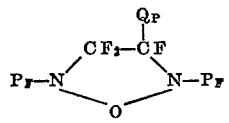

where $Q_F$ and $P_F$ are as hereinbefore defined is used. Compounds having the formula

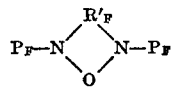

and preferably the formula

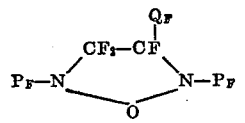

may be prepared by treating a bisnitroxide having the formula

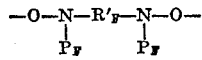

preferably the bisnitroxide

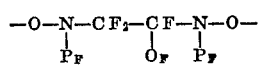

with a polyfluoronitrosoalkane, and these compounds and methods for their preparation are disclosed in our copending patent application 4382/72.

A preferred compound for use in the present invention is a volatile liquid, perfluoro-(2,5-dimethyl-1-oxa-2,5-diazacyclopentane), obtained by treating perfluoro-(2,5-dioxyl-2,5-diazahexane) with trifluoronitrosomethane, and having the formula

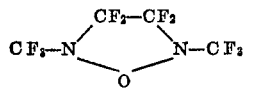

In cross-linking reactions of the present invention the polyfluoropolymer containing pendant perfluorovinyl groups and the aforesaid compound having the formula

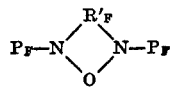

are normally mixed and heated together, optionally under pressure.

In accordance with a further alternative aspect of the present invention a process for cross-linking a polyfluoropolymer containing pendant perfluorovinyl groups comprises treating said polyfluoropolymer with an effective amount of a polymeric composition including the structural unit

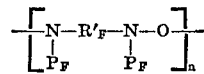

where $n$ is an integer of 1 or more and $P_F$ and $R'_F$ are as hereinbefore defined.

A preferred polymeric composition includes the structural unit

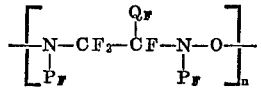

where $Q_F$ and $P_F$ and $n$ are as hereinbefore defined.

Polymeric compositions including the structural unit

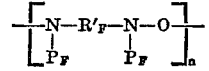

or preferably

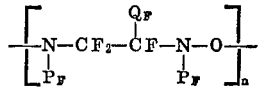

and methods for their production are disclosed in our copending patent application 4382/72.

A preferred polymeric composition for use in the present invention is the product of the reaction of trifluoronitrosomethane and perfluoro-(2,5-dioxyl-2,5-diazahexane) and contains the structural unit:

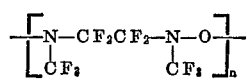

and also

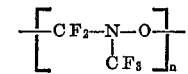

and is believed to have the structure

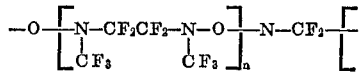

where $n$ and $m$ are integers of 1 or more, and is a viscous oil.

On heating polymeric compositions including the structural unit

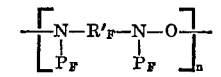

or preferably

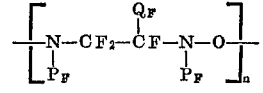

it is believed that a short life free radical intermediate is produced having the formula

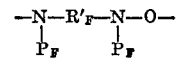

or in the preferred case

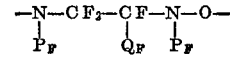

and it is probable that cross-linking reactions of the present invention take place via this diradical.

In cross-linking reactions of the present invention the polyfluoropolymer containing pendant perfluorovinyl groups and the aforesaid polymeric composition including the structural unit

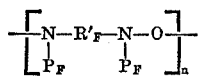

are heated together, optionally under pressure.

In accordance with a further alternative aspect of the present invention a process for cross linking a polyfluoropolymer containing pendant perfluorovinyl groups comprises treating the said elastomer with an effective amount of a polymeric composition including the structural unit

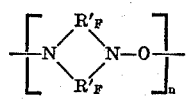

wherein $R'_F$ is as hereinbefore defined and $n$ is an integer of 1 or more.

A preferred polymeric composition includes a structural unit having the formula

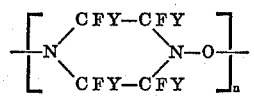

wherein Y is a fluorine or chlorine atom or a polyfluoroalkyl, chlorofluoroalkyl or polyfluorocycloalkyl group containing up to six carbon atoms and may be the same or different.

Polymeric compositions including the structural unit

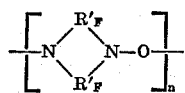

and processes for their preparation are disclosed in our copending patent application 4382/72.

On heating polymeric compositions including the structural unit

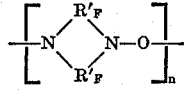

a mixture of diradicals is formed, including

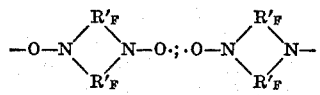

and

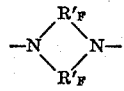

and it would appear that the cross-linking reaction takes place *via* one or more of these diradicals. In cross-linking reactions of the present invention wherein a polymeric composition including the structural unit

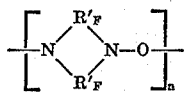

is used as cross-linking agent, it is essential that the polyfluoropolymer containing pendant perfluorovinyl groups and the polymeric composition are heated together. Preferably pressure is also applied.

A preferred polymeric composition includes the structural unit

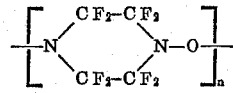

which on heating yields a deep blue liquid which is probably a mixture of:

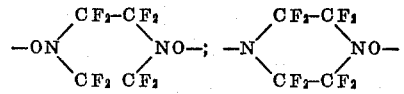

and

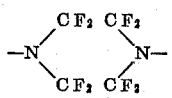

This preferred polymeric composition is prepared by fluorinating, preferably by electro-chemical fluorination, piperazine

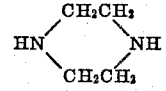

whereby the novel piperazine perfluoro - $N,N'$ - difluoropiperazine

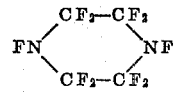

is formed, and photolysis of this piperazine with oxygen and/or silica, as described in copending application 4382/72.

In processes in accordance with the present invention, effective results may be obtained when the ratio of said polyfluoropolymer to the cross-linking agent including the structural unit

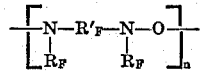

is between about 500:1 and 100:30 by weight, and preferably between about 100:3 and 100:20 by weight.

Cross-linking processes of the invention may be particularly usefully applied to the unsaturated nitroso-rubbers obtained by copolymerising perfluorobutadiene with trifluoronitrosomethane and tetrafluoroethylene.

Some processes for cross-linking polyfluoropolymers containing pendant perfluorovinyl groups in accordance with the present invention will now be described by the way of example only.

EXAMPLE 1

A 1 litre stainless steel autoclave containing an aqueous solution of lithium bromide and magnesium carbonate was charged with trifluoronitrosomethane, tetrafluoroethylene and hexafluorobutadiene in the molar ratio of 1:0.8:0.2 respectively. The contents were stirred at 1500 r.p.m. for 20 hours at a temperature of —20° C. and then allowed to warm to room temperature over a period of 16 hours. Volatiles were pumped away and dilute hydrochloric acid was added to destroy the magnesium carbonate and cause the polymer to coalesce. The terpolymer was purified by acid washing a solution of the polymer in 1,1,2-trichlorotrifluoroethane (CF$_2$Cl.CFCl$_2$).

A 10% solution of the terpolymer in 1,1,2-trichlorotrifluoroethane was mixed in the proportion of 10:1 by weight with perfluoro-(2,5-dioxyl-2,5-diazahexane)

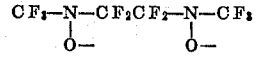

sealed in a Pyrex tube and maintained at 75° C. for 2 days. After removal of solvent a tough resilient gel was formed which was insoluble in benzene, petroleum ether (30–40° C. range), or acetone at 40° C., but was swollen by hot 1,1,2-trichlorotrifluoroethane or by perfluorotributylamine.

EXAMPLE 2

A terpolymer containing trifluoronitrosomethane, tetrafluoroethylene and perfluorobutadiene in the molar ratio of 1.0:0.7:0.3 and having an intrinsic viscosity of 0.21 in perfluorotribuylamine at 25° C. was prepared by a similar method to that described for the 1.0:0.8:0.2 terpolymer used in Example 1. The terpolymer was added to perfluoro-(2,5-dioxyl - 2,5 - diazahexane) in the ratio of 100:11 by weight, and mixed by stirring in a vessel cooled in ice.

The mixture was heated between polytetrafluoroethylene sheets for 30 minutes at 125–130° C. in a press at 500 p.s.i., and a translucent rubbery sheet was formed. The product was swollen by 1,1,2-trifluorotrichloroethane, and the swelling ratio, i.e. volume of swollen rubber/volume of dry rubber, in this solvent at 28° C. was 2.8 and the gel content 68% by weight.

EXAMPLE 3

100 parts by weight of the 1.0:0.7:0.3 terpolymer used in Example 2 was mixed with 3.5 parts by weight of perfluoro-(2,5 - dioxyl - 2,5 - diazahexane) and placed between polytetrafluoroethylene sheets in a press at 500 p.s.i. and heated for 30 minutes at 125–130° C. 41% by weight of the product was soluble in 1,1,2-trifluorotrichloroethane at 28° C. and the swelling ratio of the gel at equilibrium at this temperature was 4.0.

EXAMPLE 4

10 parts by weight of the 1.0:0.7:0.3 terpolymer used in Examples 2 and 3 was mixed with 1 part by weight of perfluoro-(2,5 - dioxyl - 2,5 - diazahexane) was placed between polytetrafluoroethylene sheets and heated at 80° C. for 1 hour in a press at 500 p.s.i. The gel content of the product was 63% by weight and the equilibrium swelling ratio was 3.3 and 1,1,2 - trifluorotrichloroethane at 28° C.

EXAMPLE 5

10 parts by weight of the 1.0:0.7:0.3 terpolymer used in Examples 2, 3 and 4 was mixed with 1 part by weight of perfluoro-(2,5 - dioxyl - 2,5 - diazahexane) and pressed between polytetrafluoroethylene sheets at 500 p.s.i. and then left to stand for 72 hours at room temperature (20–25° C.) and atmospheric pressure. The product had a gel content of 50% by weight and a swelling ratio 3.4 at equilibrium in 1,1,2-trifluorotrichloroethane at 28° C.

EXAMPLE 6

A 1 g. sample of the 1.0:0.7:0.3 terpolymer used in Examples 2 to 5 was mixed to a paste with 0.1 g. of polymeric agent including the structural unit

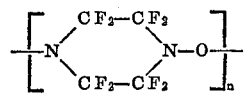

The paste was pressed between stainless steel plates in a polymer press. The pressure was maintained whilst the sample was heated gradually to 220° C. for 15 minutes and held at this temperature for a further 5 minutes. The sample was cooled to room temperature before reducing the pressure. A tough brown polymer was formed which was highly elastomeric and insoluble in fluorinated solvents, benzene, ether, and n-hexane and only slightly swollen by acetone.

Thermogravimetric analysis (nitrogen atmosphere; heating rate 15° C. per min.) showed the cured rubber (weight loss began at 180° C.; 10% weight loss had occurred at 320° C. and 20% at 370° C.) to be more thermally stable than the raw terpolymer (10% weight loss had occurred at 290° C., and 20% at 305° C.).

EXAMPLE 7

A liquid polymeric cross-linking agent was prepared as follows:

Perfluoro(2,5-dioxyl-2,5-diazahexane) (3.81 g., 12.8 mmol) and trifluoronitrosomethane (2.52 g., 25.6 mmol) were condensed in vacuo in a 300 cm.³ Pyrex tube which was then sealed and shaken mechanically for 3 days at room temperature in darkness. The products were a viscous liquid which formed ca. 45% by weight of the products, $CF_3NO_2$, $CF_3$—N=$CF_2$, and unreacted $CF_3NO$. The liquid was freed from volatile materials by evacuation at room temperature under a pressure of less than 0.1 mm. Hg., and used directly as a crosslinking agent.

The low volatility liquid is believed to have the structure:

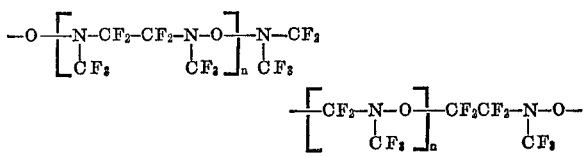

and the effective cross-linking agents may be diradicals formed by the thermal decomposition of the polymer molecules.

10 parts by weight of a gummy terpolymer containing trifluoronitrosomethane, tetraflouroethylene, and perfluorobutadiene in the molar ratios 1.00:0.75:0.25 and having an intrinsic viscosity 0.19 dl. g.$^{-1}$ in perfluoro(tributylamine) at 25° C., were mixed by stirring at room temperature with 1 part by weight of the liquid vulcanizing agent prepared as above. The mixture was placed in a mould (2" x ½" x 0.010") between polytetrafluoroethylene sheets and heated for 1½ hours in a press at 155° C. under a pressure of 1000 p.s.i. Equilibration of the product in 1,1,2-trifluorotrichloroethane for 3 days at 28° C. showed that it contained 65.7% by weight of insoluble, crosslinked terpolymer and had a swelling ratio (i.e. volume of swollen network/volume of dry rubber) of 3.57.

A sample of identical composition which was heated in the press under similar conditions for 4 hours had a gel content of 65.8% and a swelling ratio 3.33.

Thermogravimetric analysis showed that the thermal stabilities of the crosslinked terpolymer samples were essentially the same as that of the raw elastomer. Thus, on heating under nitrogen at the rate of 15° C./min., the raw terpolymer began to lose weight at 85° C. and had lost 10% of its weight at 190° C. The cured terpolymer which had a swelling ratio 3.33 began to lose weight at 95° C. and had suffered a 10% weight loss at 210° C. when heated under the same conditions. The gel fraction of this crosslinked terpolymer began to lose weight at 200° C. and had lost 10% of its weight when the temperature had reached 265° C.

EXAMPLE 8

A gummy terpolymer containing $CF_3NO$, $C_2F_4$, and $C_4F_6$ in the molar ratios 1.00:0.75:0.25 and having an intrinsic viscosity 0.21 dl. g.$^{-1}$ in perfluoro(tributylamine) at 25° C., was fractionated by addition of acetone as precipitant to its solution in 1,1,2-trifluorotrichloroethane at 25° C. The fraction of highest molecular weight was an elastomeric solid having an intrinsic viscosity 0.52 dl. g.$^{-1}$ in perfluoro(tributylamine) at 25° C. 10 parts by weight of this fraction of the terpolymer were mixed with 1 part by weight of the liquid vulcanizing agent (as prepared in Example 7) in 1,1,2-trifluorotrichloroethane. The solvent was then removed by evaporation at room temperature in vacuo and a sample was placed in the mould (2" x ½" x 0.010") and cured by heating for 3 hours at 155° C. in the press between polytetrafluoroethylene sheets under a pressure of 1000 p.s.i.

Equilibration of the product in 1,1,2-trifluorotrichloroethane at 28 C. for 3 days showed that it contained 94% by weight of insoluble gel and had a swelling ratio 2.22. Thermogravimetric analysis showed that the thermal stabilities of the crosslinked material and the raw terpolymer fraction were essentially the same. When heated under nitrogen at the rate of 15° C./min., the raw terpolymer fraction began to lose weight at 205° C. and had lost 10% of its weight when the temperature had reached 280° C. The corresponding temperatures for the cross-linked terpolymer were 125° C. and 260° C. and for the gel fraction 205° C. and 265° C.

We claim:

1. A process for cross-linking a polyfluoropolymer containing pendant perfluorovinyl groups and including the step of treating the polyfluoropolymer with an effective amount of a cross-linking agent including the structural unit:

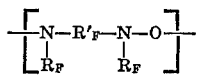

wherein $R'_F$ is a divalent polyfluoroalkylene group having a chain length of from 1 to 4 carbon atoms and which may have one or more substituents selected from a group consisting of chloro-, polyfluroroalkyl, chlorofluoroalkyl and polyfluorocycloalkyl groups containing up to six carbon atoms, and $R_F$ is selected from a group consisting of monovalent polyfluoroalkyl, polyfluorocycloalkyl and chlorofluoroalkyl groups containing up to ten carbon atoms and divalent polyfluoroalkylene groups having a chain length of 1 to 4 carbon atoms which may have one or more substituents selected from a group consisting of chloro-, polyfluoroalkyl, chlorofluoroalkyl and polyfluorocycloalkyl groups containing up to six carbon atoms and interconnected to form a cyclic structure.

2. A process as claimed in claim 1 wherein the cross-linking agent is a diradical having the general formula

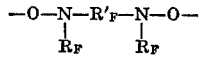

wherein $R_F$ and $R'_F$ are as hereinbefore defined.

3. A process as claimed in claim 2 wherein the cross-linking agent is a bisnitroxide diradical having the general formula

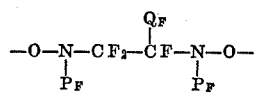

wherein $P_F$ is selected from a group consisting of polyfluoroalkyl, polyfluorocycloalkyl and chlorofluoroalkyl groups containing up to ten carbon atoms and $Q_F$ is selected from a group consisting of chloro-, fluoro-, polyfluoroalkyl, polyfluorocycloalkyl and chlorofluoroalkyl groups containing up to six carbon atoms.

4. A process as claimed in claim 3 wherein the cross-linking agent is perfluoro-(2,5-dioxyl-2,5-diazahexane)

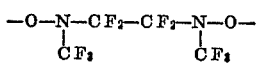

5. A process as claimed in claim 1 wherein the cross-linking agent and polyfluoropolymer containing pendant perfluorovinyl groups are heated together.

6. A process as claimed in claim 1 wherein the polyfluoropolymer containing pendant perfluorovinyl groups is heated with a cross-linking agent which is a compound having the formula

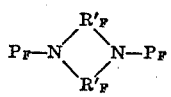

wherein $P_F$ and $R'_F$ are as hereinbefore defined.

7. A process as claimed in claim 6 wherein the cross-linking agent is a compound having the formula

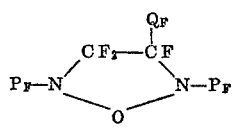

wherein $P_F$ and $Q_F$ are as hereinbefore defined.

8. A process as claimed in claim 7 wherein the compound is perfluoro-(2,5-dimethyl - 1 - oxa-2,5-diazacyclopentane, having the formula

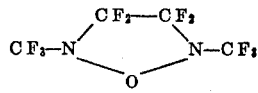

9. A process as claimed in claim 1 wherein the polyfluoropolymer is heated with a cross-linking agent which is a polymeric composition including the structural unit

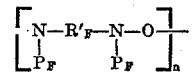

wherein $P_F$ and $R'_F$ are as hereinbefore defined and $n$ is an integer of one or more.

10. A process as claimed in claim 9 wherein the polymeric composition includes the structural unit

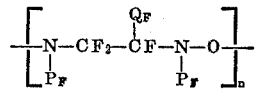

wherein $P_F$ and $Q_F$ are as hereinbefore defined.

11. A process as claimed in claim 10 wherein the cross-linking agent includes the structural unit

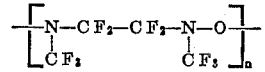

12. A process as claimed in claim 9 wherein the cross-linking agent is a polymeric composition having the structure

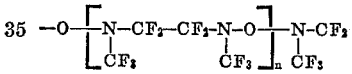

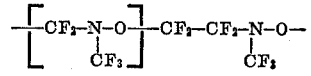

where $n$ and $m$ are integers of one or more.

13. A process as claimed in claim 1 wherein the polyfluoropolymer is heated with a cros-linking agent which is a polymeric composition including the structural unit

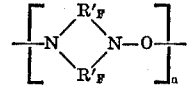

wherein $R'_F$ is as hereinbefore defined and $n$ is an integer of one or more

14. A process as claimed in claim 13 wherein the cross-linking agent includes a structural unit having the formula

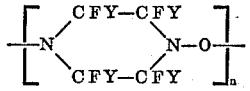

wherein Y is independently selected from a group consisting of fluoro-, chloro-, polyfluoroalkyl, chlorofluoroalkyl and polyfluorocycloalkyl groups containing up to six carbon atoms, and $n$ is an integer of one or more.

15. A process as claimed in claim 14 wherein the cross-linking agent is a polymeric composition including the structural unit

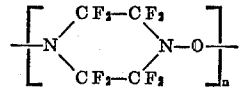

16. A process as claimed in claim 1 wherein the cross-linking agent is heated with the polyfluoropolymer containing pendant perfluorovinyl groups under pressure.

17. A process as claimed in claim 1 wherein the ratio of polyfluoropolymer to cross-linking agent is between 500:1 and 100:30 by weight.

18. A process as claimed in claim 17 wherein the ratio is between 100:3 and 100:20 by weight.

19. A process as claimed in claim 1 wherein the polyfluoropolymer containing pendant perfluorovinyl groups is a nitroso-rubber.

20. A process as claimed in claim 19 wherein the nitroso rubber is a terpolymer obtained by copolymerising a perfluoronitrosoalkane with a perfluoro-olefin and a diene.

21. A process as claimed in claim 20 wherein the terpolymer is obtained by copolymerising perfluorobutadiene, trifluoronitrosomethane and tetrafluoroethylene.

22. A cross linked polymer when produced by a process as claimed in claim 1.

References Cited

UNITED STATES PATENTS 3,065,214  11/1962  Rose et al. _____ 260—92.1 A
3,436,384  4/1969   Crawford, Jr. ____ 260—92.1 A MURRAY TILLMAN, Primary Examiner J. ZIEGLER, Assistant Examiner U.S. Cl. X.R.

260—92.1 A, 533 D

UNITED STATES PATENT OFFICE
CERTIFICATE OF CORRECTION

Patent No. 3,812,206              Dated      May 21, 1974

Inventor(s)  RONALD ERIC BANKS and ROBERT NEVILLE HASZELDINE

It is certified that error appears in the above-identified patent and that said Letters Patent are hereby corrected as shown below:

Column 1, line 4, change "Haszelding" to --Haszeldine--.

Column 1, line 41, change "$(R_F)_x$" and "$R_F$" to --$(R_F^*)_x$-- and --$R_F^*$--, respectively.

Column 2, line 31, cancel ";"; column 2, lines 45, 52 and 65, change "-O" and "O-" to --•O-- and --O•--, respectively.

Column 2, line 67, change "4382/72" to --327,839 filed January 31, 1973--.

Column 3, line 7, change "-O" and "O-" to --•O-- and --O•-- respectively.

Column 3, line 45, change "-O" and "O-" to --•O-- and --O•-- respectively.

Column 3, line 50, change "-O" and "O-" to --•O-- and --O•-- respectively.

Column 3, line 53, change "3282/72" to --327,839 filed January 31, 1973--.

Column 4, line 33, change "-O" to --•O--.

Column 4, line 47, change "$CF_2$" and "O-" to --$CF_2$-- and --O•-- respectively.

Column 4, line 65, change "-N" and "O-" to --•N-- and --O•-- respectively.

UNITED STATES PATENT OFFICE
CERTIFICATE OF CORRECTION

Page 2

Patent No. 3,812,206          Dated    May 21, 1974

Inventor(s)  RONALD ERIC BANKS and ROBERT NEVILLE HASZELDINE

It is certified that error appears in the above-identified patent and that said Letters Patent are hereby corrected as shown below:

Column 4, line 70, change "-N" and "O-" to -- •N-- and --O•-- respectively.

Column 5, line 38, change "3282/72" to --327,839 filed January 31, 1973--.

Column 5, line 49, change "-O" and "N-" to --•O-- and --N•-- respectively.

Column 5, line 54, change "-N" and "N-" to --•N-- and --N•-- respectively.

Column 6, line 4, change "-O", "O-", "-N" and "O-" to --•O--, --O•--, --•N-- and --O•--, respectively.

Column 6, line 10, change "-N" and "N-" to --•N-- and --N•-- respectively.

Column 6, line 28, change "3282/72" to --327,839 filed January 31, 1973--.

Column 6, line 65, change "O-" (both occurrences) to --O•--.

Column 8, line 11, change "-O" and "$CF_2$" to --•O-- and --$CF_2$-- respectively.

Column 8, line 14, change "O-" to --O•--.

Column 9, line 33, change "-O" and "O-" to --•O-- and --O•-- respectively.

UNITED STATES PATENT OFFICE  
Page 3

CERTIFICATE OF CORRECTION

Patent No. 3,812,206          Dated      May 21, 1974

Inventor(s) RONALD ERIC BANKS and ROBERT NEVILLE HASZELDINE

It is certified that error appears in the above-identified patent and that said Letters Patent are hereby corrected as shown below:

Column 9, lines 42 and 53, change "-O" and "O-" to --•O-- and --O•-- respectively.

Column 10, line 35, change "-O" and "$CF_2$" to --•O-- and --$CF_2$-- respectively.

Column 10, line 38, change "O-" to --O•--.

Column 10, line 43, change "cros" to --cross--.

Signed and sealed this 10th day of December 1974.

(SEAL)  
Attest:

McCOY M. GIBSON JR.          C. MARSHALL DANN  
Attesting Officer             Commissioner of Patents